UNITED STATES PATENT OFFICE.

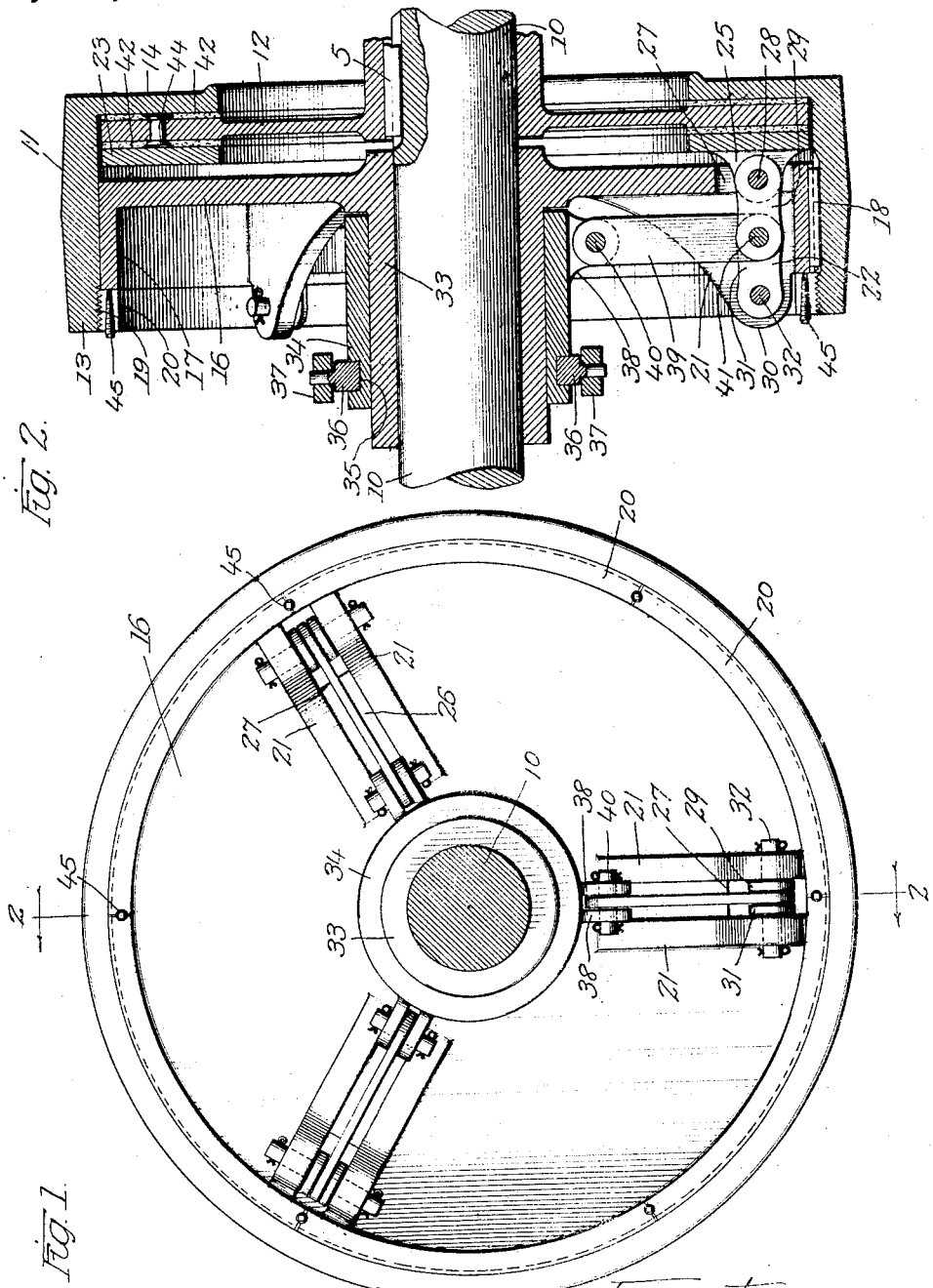

CARL F. PEARSON, OF CHICAGO, ILLINOIS, ASSIGNOR TO CHICAGO MACHINE & MOTOR MFG. CO., OF CHICAGO, ILLINOIS, A CORPORATION OF ILLINOIS.

CLUTCH.

1,374,319.

Specification of Letters Patent.

Patented Apr. 12, 1921.

Application filed September 2, 1919. Serial No. 321,006.

*To all whom it may concern:*

Be it known that I, CARL F. PEARSON, a citizen of the United States, residing at Chicago, in the county of Cook and State of Illinois, have invented certain new and useful Improvements in Clutches, of which the following is a specification.

The invention relates to an improvement in clutches.

One of the objects of the invention is to provide an improved efficient clutch for line shafting, in which both of the clutch members are mounted on the same shaft.

Another object is to provide improved and convenient means for adjusting the relation of the clutch operating mechanism to compensate for wear of the parts.

Another object is to make one of the clutch members of disk form and to engage both sides thereof by the other member.

Another object is to provide a self-contained clutch that will not require adjustment in mounting after being placed upon the shaft.

Another object is to provide a clutch in which a pulley constitutes one member, with the other member and all of the operating mechanism thereof within the confines of the pulley.

Other further and more specific objects of my invention will become readily apparent, to persons skilled in the art, from a consideration of the following description, when taken in conjunction with the drawings, wherein:—

Figure 1 is an end view of the clutch.

Fig. 2 is a longitudinal section, taken on line 2—2 of Fig. 1.

In both the views the same reference characters are used to indicate similar parts.

In the drawings, 10 indicates a shaft upon which the clutch is shown to be placed and which constitutes the driving or driven means, in some instances the pulley 11 being the other means by or from which power is either received or transmitted. The other clutch member is the disk 12, contained entirely within the pulley, and secured to the shaft. The pulley is provided with a rim 13, and an inwardly extending flange 14, which flange member engages a similar surface of the member 12. In the particular exemplification, the member 12 is secured to the shaft 10 by a key 5. A disk 16 is provided with a peripheral rim 17, which slips freely into the rim 13 of the pulley. The rim 17 is rotatably secured to the rim 13 by a key 18. The outer edge of the rim 13 is screw threaded, as at 19, for a multipart ring 20. At intervals on the disk 16, and extending outwardly, are a plurality of pairs of brackets, consisting of the parallel members 21, between which is contained a plurality of toggles 22, for operating the clutch. In the particular instance three such toggles are shown in Fig. 1, but it is, of course, manifest that any number desired may be used, within the contemplation of the invention.

Between the disk 16 and the clutch member 12 is a flat floating ring 23, having a plurality of pairs of laterally extending bracket members 25, each pair of which extends into the space 26, between the bracket members 21, on the disk 16. An opening 27 is cut through the disk 16 to permit the bracket members 25 to pass therethrough. Pivoted between the bracket members 25, on the pin 28, is a pair of toggle links 29, and pivoted to the brackets 21, near the outer ends thereof, as at 30, is a link 31, on the pin 32. The disk 16 is provided with a hub 33 that is normally loose upon the shaft 10, and over the hub 33 is a slidable sleeve 34 having an annular groove 35, to receive the studs or rollers 36, operated by a pronged lever 37. Located in spaced apart distances around the sleeve 34 are pairs of brackets 38, between which is pivoted a link 39, on the pin 40. The outer end of the link 39 is pivoted also to the links 29 and 31, on the pin 41.

Fastened to opposite sides of the friction surfaces of the member 12 are flat rings 42, that may be of some yielding material, such as a suitable fabric, having a high friction co-efficient. Rivets 44 may be employed for securing the flat rings 42 to the outer peripheral side faces of the member 12.

Now it will be manifest that the toggles, consisting of the links 29 and 31, are straightened by pushing the sleeve 34 inwardly, whereupon the links 39 will straighten the toggles 22, as shown in Fig. 2, and force the friction members into tight engagement, thereby substantially coupling the pulley 11 to the shaft 10. For the purpose of adjustment to compensate for wear, I provide the ring 20, and divide it into a series of sections, and the ends of the sections I thread for a taper, screw threaded plug, or screw 45, so that as the screws are turned inwardly the circumference of the multi-part ring is increased in dimensions. The ring 20 is employed to locate and fix the rim 17, within the rim 13, so as to change the distance apart of the pivoted points 28 and 32 of the toggle members 22, to compensate for any wear of the friction-engaging surfaces of the clutch members.

While only a single embodiment of the invention has been shown in the drawings, it will be clearly manifest that changes in the arrangement and disposition of the parts may be made, within the scope of the appended claims.

Having described my invention, what I claim is new, and for which I desire to secure Letters Patent, is:—

1. A clutch having in combination a slidable rotatable clutch member (14) provided with a laterally extending flange (11); a disk (16) within the flange and adjustably fixed thereto and rotatable with the flange and said clutch member; a disk (12) between the disk (16) and member (14) having friction engaging surfaces (42), a ring (23) between the disk (12) and the disk (16); a toggle having one of its links connected to the ring (23) and the other to the disk (16) and sliding means to operate the toggle.

2. A clutch having in combination an axially movable clutch member providing a flange in a radial plane and an integral surrounding pulley flange; a disk, axially adjustable with respect to said clutch member and rotatable therewith; another clutch member between the disk and the first mentioned clutch member; an axially movable ring between the disk and the last mentioned clutch member; a toggle having one link connected to the ring and the other link connected to the disk and a three part threaded ring (20) engaging the inner surface of the pulley flange to adjust the position of the disk (16) with respect to the clutch member (14).

In testimony whereof I hereunto subscribe my name.

CARL F. PEARSON.